March 4, 1941.  G. KELLEY  2,233,982
DYNAMOELECTRIC MACHINE
Filed July 7, 1938   2 Sheets-Sheet 1
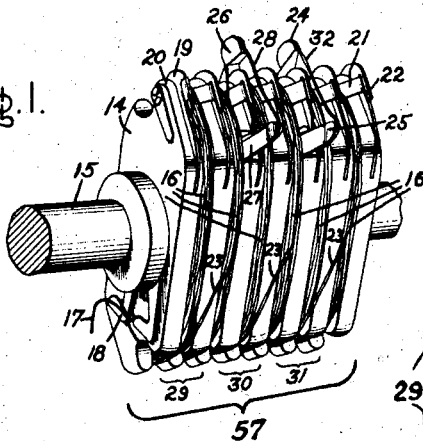
Inventor:
Gordon Kelley
by Harry E. Dunham
His Attorney.

March 4, 1941.　　　　G. KELLEY　　　　2,233,982
DYNAMOELECTRIC MACHINE
Filed July 7, 1938　　　2 Sheets-Sheet 2

Inventor:
Gordon Kelley,
by Harry E. Dunham
His Attorney.

Patented Mar. 4, 1941

2,233,982

UNITED STATES PATENT OFFICE 2,233,982

DYNAMOELECTRIC MACHINE

Gordon Kelley, Nahant, Mass., assignor to General Electric Company, a corporation of New York Application July 7, 1938, Serial No. 217,897

16 Claims. (Cl. 171—252)

My invention relates to dynamoelectric machines.

In making exciting windings for dynamoelectric machines utilizing formed coils, the general practice has been to form separately each coil group adapted to be arranged in adjacent slots in the magnetic core structure of the machine. These separate coil groups then are applied to the machine element and interconnected by welding, brazing, or soldering in accordance with the desired arrangement of the completed winding. This produces a large number of joints in the finished exciting winding, and even if such a winding is thoroughly tested before it is placed into use there is a tendency for these joints to become separated when the machine has been in operation for some time. Furthermore, since these joints usually are individually insulated, it may be a tedious task to determine which joint has become disconnected.

An object of my invention is to provide an improved and simplified dynamoelectric machine.

Another object of my invention is to provide a simplified winding for an electric machine element.

A further object of my invention is to provide an improved and simplified method of winding an electric machine element.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 5:
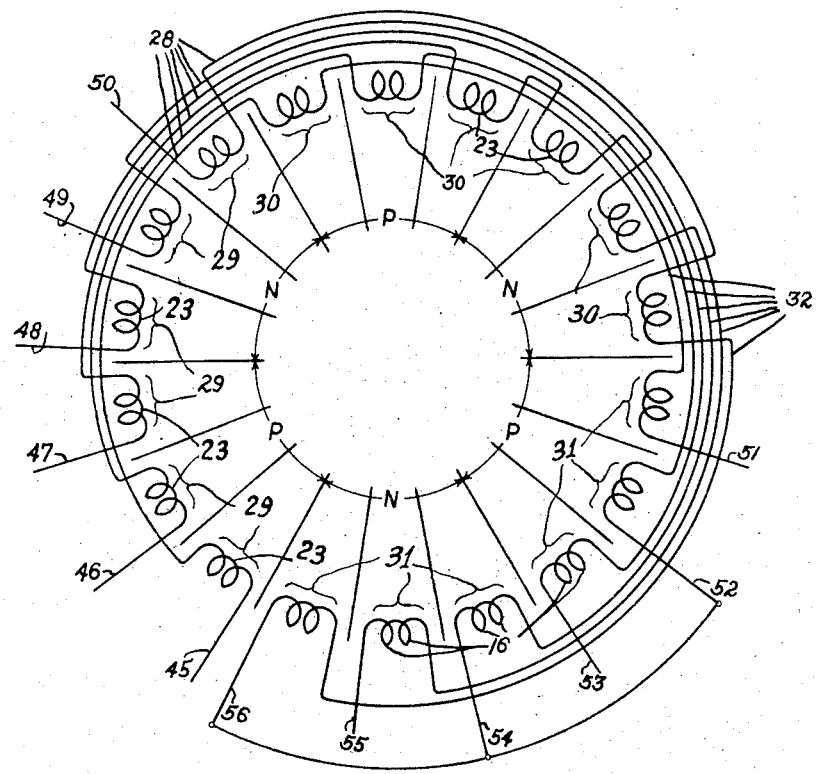
Figures 6, 7:
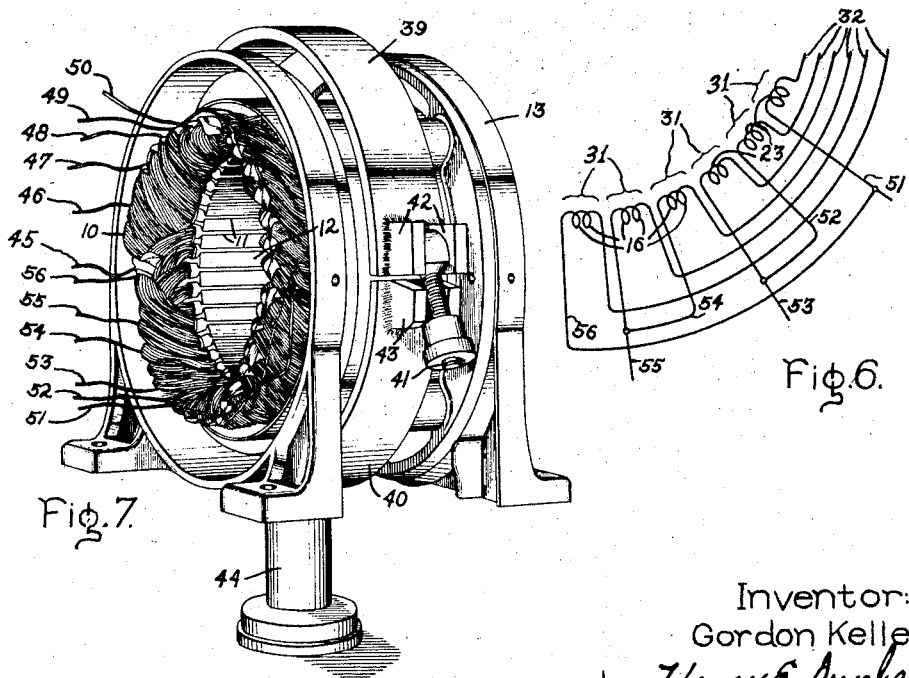

For a better understanding of my invention, reference is made to the accompanying drawings wherein Fig. 1 is a perspective view of a coil winding device for forming coils for my improved winding; Fig. 2 is a schematic diagram illustrating an arrangement for grouping certain portions of my improved winding, where each loop schematically represents one coil as shown in Fig. 1; Fig. 3 schematically illustrates the method of arranging the groupings of the coils shown in Fig. 2; Fig. 4 illustrates the method of connecting the various parts of the winding to provide different winding circuits; Fig. 5 schematically illustrates the arrangement of the coils of my improved winding applied to an electric machine element when connected as a three-phase Y-circuit; Fig. 6 schematically illustrates the connection of the phase terminals of the arrangement in Fig. 5 when connected as a three phase Δ-circuit; and Fig. 7 is a perspective view of the stationary member of a dynamoelectric machine to which has been applied a winding as shown in Fig. 5.

Referring to the drawings, I have shown my invention in connection with a six-pole, three-phase exciting winding 10 arranged in slots 11 of a laminated core 12 of a stationary member 13 of a dynamoelectric machine. In making the winding 10, a conventional type form winding machine may be used, which is provided with a plurality of rotatable coil former elements 14 mounted on a drive shaft 15. In order to minimize connections between coils or coil belts of the winding, all of the coils of each phase of the machine are adapted to provide poles of the same polarity are formed of a single continuous substantially uniform conductor. As shown in Fig. 1, six coil parts 16 are wound from a continuous conductor, and each coil 16 is formed of a predetermined number of turns in a groove of one of the coil former elements 14. In making such a set or phase group 57 of coils, an end 17 of the conductor is turned about a hook 18 secured to the outside of the end coil former 14. Each of the coil formers is provided with a slotted metal insert 19 which projects beyond an end of a coil former body flange 20. A section of adhesive tape 21 is inserted into slots 22 of the elements 19, and the coil former assembly is then rotated to wind the predetermined desired number of turns of the first coil 16. The coil former assembly is then momentarily stopped and the conductor guided into the groove of the second coil former 14, thereby providing a short coil connecting conductor 23. The coil formers then are again rotated to form the desired number of turns on the second coil 16. The conductor then is passed over a pair of grooves 24 and 25 in spaced-apart guide fingers 26 and 27, respectively, secured to the third coil former element. This provides a predetermined extra length of a conductor 28 connecting together the first two coil groups or belts in the phase group of coils. The conductor is then guided into the third coil former element, and the coil former assembly again is rotated to provide the predetermined desired number of turns to the third coil. The fourth and sixth coils are formed similar to the second coil, and the fifth coil is formed similar to the third coil, until all six coils 16 are wound. This provides a phase group of coils 57 wherein adjacent pairs of coils form three coil groups or belts 29, 30, and 31 connected together by extra lengths 28 and 32 of the conductor forming these coils. After a phase group of coils 57 has been completely wound, the tape 21 is cut adjacent each slot 22 in the elements 19, and the free ends of each small section of tape around which the coils have been wound are turned about the coil to secure together the various conductor turns forming each coil. Thus the preformed set or phase group 57 of coils shown in Fig. 1 provides a phase group 57 of coils wherein each coil group or belt adapted to form one of the poles of the machine includes a pair of coils, and since the machine is a six-pole machine, the phase groups 57 forming poles of like polarity include three coil groups or belts. All of the coils of all of the phase groups 57 of coils are wound in the same direction, and it is, therefore, necessary to arrange and connect the phase groups 57 of coils in such a manner as to provide the desired polarity and circuit arrangement for the machine.

In order to facilitate and simplify the assembly of the winding on the stationary member 13 of the dynamoelectric machine, I group and arrange the coils consecutively in the order in which they are to be applied in the slots 11 of the laminated core 12. Since the phase groups 57 of coils for the illustrated machine include three coil groups or belts, I provide three assembly pegs 33, 34, and 35 secured to an assembly board 36. On these assembly pegs, I group in consecutive and similar order corresponding coil groups or belts of different phase groups 57 of coils, as shown in Fig. 2. This provides three groupings of corresponding coil groups or belts 29, 30, and 31 arranged on the three assembly pegs 33, 34, and 35, respectively. These groupings of coils are then arranged in consecutive order on an assembly peg 37 secured to a mounting plate 38, as shown in Fig. 3.

A stationary member 13 is then mounted on an assembly table and clamped between complementary segments 39 and 40 of a mounting ring. These ring segments are secured together by a clamping draw bolt 41 pivotally secured to lugs 42 on the segment 39 and adapted to engage complementary lugs 43 on the lower ring segment 40. This lower ring segment 40 is supported above the mounting table and rigidly secured thereto by a mounting base 44. The consecutively arranged coils supported on the peg 37 then are applied consecutively in similar order to the laminated core 12. This complete assembly of coils provides a winding as shown in Fig. 7 and schematically illustrated in Fig. 5.

Three-phase dynamoelectric machine exciting windings may be connected in Δ or Y, and it sometimes also is desirable to provide an exciting circuit which may be connected for a high or low voltage by connecting certain phase groups in series or parallel relation. The twelve terminals of the six phase groups of coils are the only coil connections in my improved winding. The consecutive terminals 45, 46, 47, 48, 49, and 50 at one end of the six consecutively arranged phase groups of coils and the terminals 51, 53, and 55 at the other end of the first, third, and fifth phase groups of coils are connected to a terminal board schematically illustrated in Fig. 4. The six terminals 51, 52, 53, 54, 55, and 56 at the other ends of the six phase groups of coils are adapted to be interconnected to provide a Δ or Y circuit for the winding. If it is desired to provide a Y-connected winding, the terminals 52, 54, and 56 are connected together by welding or soldering, as shown in Fig. 5, and the terminals 51, 53, and 55 are connected to the terminal board. A Δ connected winding may be provided by connecting the terminals 52, 54, and 56 to the terminals 53, 55, and 51, respectively, as shown in Fig. 6. This connection of terminals to provide a Δ or Y circuit is the only permanent interconnection which need be made in the circuit of my improved exciting winding. The nine terminals of the winding which are connected to the terminal board may then be connected in parallel or series as shown in Fig. 4, and the terminals 51, 53, and 55 are adapted to be connected to a three-phase source of electrical power supply. As shown in the upper and lower halves of Fig. 4, a Δ or Y-connected winding, respectively, may be connected for high or low voltage by connecting certain of the phase groups of coils in series or parallel, respectively, and in addition, poles of opposite polarity may be produced by the phase groups of coils thus connected in series or parallel. Fig. 5 illustrates the relative instantaneous polarities for a given instantaneous energization of coil belts of different phases of the winding for any of the connections shown in Fig. 4, and the positive and negative polarities of the coil belts are indicated in this figure by the letters P and N respectively.

In this manner, I have provided an improved and simplified exciting winding for a dynamoelectric machine and method of making the same, which includes only one permanent welded or soldered interconnection between the coils forming the winding, and thus provides a more reliable construction, as well as a construction which is cheaper to build and neater in appearance.

While I have illustrated and described my invention in connection with a three-phase six-pole exciting winding for the stationary member of a dynamoelectric machine, it is apparent that variations thereof for different types of windings will occur to those skilled in the art. I desire it to be understood, therefore, that I intend in the appended claims to cover all modifications which do not depart from the spirit and scope of my invention.

What I claim as new and desire to secure by Letters Patent of the United States, is:

1. An electric machine winding including a plurality of coils, said coils being arranged in phase groups and formed of a continuous substantially uniform conductor throughout each phase group.

2. An electric machine winding including a plurality of coils arranged to provide a plurality of phase groups of coils, all of said coils in each respective phase group being arranged to provide a magnetic excitation of the same polarity and being formed of a continuous substantially uniform conductor.

3. An electric machine winding including a plurality of coils arranged to provide a plurality of phase groups of coils, all of said coils in each respective phase group being arranged to provide a magnetic excitation of the same polarity and being formed of a continuous conductor, and means for connecting said phase groups to provide a magnetic excitation of different polarity by different phase groups of coils.

4. An electric machine winding including a plurality of coils arranged to provide a plurality of phase groups of coils, all of said coils in each respective phase group being formed of a continuous substantially uniform conductor, and means for directly connecting together certain of said phase groups to provide a magnetic excitation of different polarity by corresponding coils of said directly connected phase groups.

5. An electric machine winding including a plurality of coils arranged to provide a plurality of phase groups of coils, all of said coils in each respective phase group being formed of a continuous substantially uniform conductor, and means for connecting together in series certain of said phase groups of coils to provide a magnetic excitation of different polarity by corresponding coils of said series-connected phase groups of coils.

6. An electric machine winding including a plurality of coils arranged to provide a plurality of phase groups of coils, all of said coils in each respective phase group being formed of a continuous substantially uniform conductor, and means for connecting together in parallel certain of said phase groups of coils to provide a magnetic excitation of different polarity by corresponding coils of different parallel connected phase groups of coils.

7. A dynamoelectric machine including a stationary member having an exciting winding arranged to provide a plurality of pairs of poles, said winding having a plurality of phase groups of coils, all of said coils in each respective phase group being arranged to provide a magnetic excitation of the same polarity and being formed of a continuous conductor, an extra predetermined length of conductor provided between certain coils in said phase groups, a plurality of coil groups connected by said extra length coil connecting conductors corresponding to the plurality of pairs of poles, and means for directly connecting together certain of said phase groups of coils to provide a magnetic excitation of different polarity between coils of said directly connected phase groups of coils.

8. A method of winding an electric machine element which comprises winding a plurality of coils in the same direction from a continuous conductor to form a phase group of coils, applying in consecutive order on the machine element corresponding coils of a plurality of phase groups, and connecting the phase groups of coils to provide a magnetic excitation of different polarity by the coils of the different phase groups.

9. A method of winding an electric machine element which comprises winding a plurality of coils in the same direction from a continuous conductor to form a phase group of coils, grouping in consecutive order corresponding coils of a plurality of phase groups, arranging in consecutive order the groupings of corresponding coils of the plurality of phase groups, and applying consequently the coils in the arranged order to the machine element.

10. A method of winding an electric machine element which comprises winding a plurality of coils in the same direction from a continuous conductor to form a phase group of coils, grouping in consecutive order corresponding coils of a plurality of phase groups, applying consecutively the coils in the arranged order to the machine element, and connecting together certain of the phase groups of coils to provide a magnetic excitation of different polarity by corresponding coils of the connected phase groups.

11. A method of winding an electric machine element which comprises winding a plurality of coils in the same direction from a continuous conductor to form a phase group of coils, grouping in consecutive order corresponding coils of a plurality of phase groups, arranging in consecutive order the groupings of corresponding coils of the plurality of phase groups, applying consecutively the coils in the arranged order to the machine element to provide the same polarity by all of the coils of each respective phase group, and connecting the phase groups of coils to provide a magnetic excitation of different polarity by the coils of different phase groups.

12. A method of winding an electric machine element which comprises winding a plurality of coils in the same direction from a continuous conductor to form a phase group of coils and providing a predetermined extra length of conductor between certain coils in the phase group, applying in consecutive order on the machine element corresponding coils between the extra length coil connecting conductors of a plurality of phase groups, and connecting the phase groups of coils to provide a magnetic excitation of different polarity by the coils of different phase groups.

13. A method of winding a three-phase electric machine element having a plurality of pairs of poles, which comprises winding a plurality of coils in the same direction from a continuous conductor to form a phase group of coils and providing an extra predetermined length of conductor between certain coils in the phase group to form a plurality of coil groups corresponding to a plurality of pairs of poles connected by the extra length coil connecting conductors, applying in consecutive order on the machine element corresponding coil groups of a plurality of phase groups of coils, and directly connecting the phase groups of coils to provide a magnetic excitation of different polarity by the coils of the directly connected different phase groups of coils.

14. A method of winding a polyphase electric machine element having a plurality of pairs of poles, which comprises winding a plurality of coils in the same direction from a continuous conductor to form a phase group of coils and providing an extra predetermined length of conductor between certain coils in the phase group to form a plurality of coil groups corresponding to the plurality of pairs of poles of the winding, forming a plurality of phase groups of coils corresponding to twice the number of phases of the machine element, grouping in consecutive order corresponding coil groups of the different phase groups, arranging in consecutive order the grouping of corresponding coil groups of the plurality of phase groups of coils, applying consecutively the coils in the arranged order to the machine element, and directly connecting certain of the phase groups of coils to provide a magnetic excitation of different polarity by the coils of these certain directly connected phase groups of coils.

15. A method of winding a three-phase electric machine element having a plurality of pairs of poles, which comprises winding a plurality of coils in the same direction from a continuous conductor to form a phase group of coils and providing an extra predetermined length of conductor between certain coils in the phase group to form a plurality of coil groups corresponding to the plurality of pairs of poles of the winding, forming six phase groups of coils, grouping in consecutive and similar order corresponding coil groups of the different phase groups, arranging in consecutive order the groupings of corresponding coil groups of the plurality of phase groups of coils, applying consecutively the coils in the arranged order to the machine element, and connecting together into pairs each third phase group of coils to provide a magnetic excitation of different polarity between coils of these connected phase groups of coils.

16. A method of making a winding for an electrical machine including forming a plurality of coils, and providing a predetermined length of connecting conductor between a predetermined number of adjacent coils and another relatively greater length of connecting conductor between groups of coils connected together by said first-mentioned connecting conductors to provide a plurality of groups of coils connected together by said last-mentioned connecting conductors.

GORDON KELLEY.